(12) United States Patent
Tomita

(10) Patent No.: US 7,397,589 B2
(45) Date of Patent: Jul. 8, 2008

(54) OPTICAL SCANNING DEVICE AND IMAGE FORMING APPARATUS USING THE DEVICE

(75) Inventor: Yasumasa Tomita, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 269 days.

(21) Appl. No.: 10/992,692

(22) Filed: Nov. 22, 2004

(65) Prior Publication Data

US 2005/0111065 A1 May 26, 2005

(30) Foreign Application Priority Data

| Nov. 20, 2003 | (JP) | ............................. 2003-390594 |
| Apr. 15, 2004 | (JP) | ............................. 2004-120266 |
| May 19, 2004 | (JP) | ............................. 2004-149022 |

(51) Int. Cl.
G02B 26/08 (2006.01)

(52) U.S. Cl. ..................................... 359/201

(58) Field of Classification Search ................. 359/201, 359/205–207
See application file for complete search history.

(56) References Cited

U.S. PATENT DOCUMENTS 6,304,360 B1 * 10/2001 Sekikawa ................... 359/204

FOREIGN PATENT DOCUMENTS

| JP | 10-148777 | 6/1998 |
| JP | 2002-196271 | 7/2002 |
| JP | 2002-202472 | 7/2002 |

* cited by examiner

*Primary Examiner*—Euncha P Cherry
(74) *Attorney, Agent, or Firm*—Oblon, Spivak, McClelland, Maier & Neustadt, P.C.

(57) ABSTRACT

An optical scanning device for scanning surfaces of an even number of photoconductors simultaneously includes a rotating deflecting device arranged substantially at a center in a housing to deflect optical beams, and a plurality of scanning optical systems corresponding to the even number of photoconductors, arranged to be substantially symmetrical with the rotating deflecting device as a symmetry center. The plurality of scanning optical systems include a plurality of folding-back mirrors and at least one long lens having power in a sub-scanning direction, respectively, and the pluralities of folding-back mirrors and the at least one long lenses of the symmetrically arranged scanning optical systems are arranged to be symmetrical to each other with the rotating deflecting device as the symmetry center, respectively.

20 Claims, 5 Drawing Sheets

OPTICAL SCANNING DEVICE AND IMAGE FORMING APPARATUS USING THE DEVICE

CROSS-REFERENCE TO RELATED APPLICATIONS

The present application claims priority and contains subject matter related to Japanese Patent Applications No. 2003-390594, No. 2004-120266, and No. 2004-149022 filed in the Japanese Patent Office on Nov. 20, 2003, Apr. 15, 2004 and May 19, 2004, respectively, and the entire contents of each of which are hereby incorporated herein by reference.

BACKGROUND OF THE INVENTION

1. Field of the Invention

The present invention relates generally to an opposed type optical scanning device capable of simultaneously scanning surfaces of plural photoconductors in a multi-color image forming apparatus such as a color laser printer, a digital color copier, etc., and more particularly relates to an arrangement of optical elements in the optical scanning device.

2. Discussion of the Background

An image forming apparatus includes an optical scanning device to optically scan a surface of a photoconductor to write an electrostatic latent image on the photoconductor. The optical scanning device is generally configured such that an optical beam from a light source is deflected by a rotating deflector, the deflected beam is formed into a beam spot on a surface of the photoconductor by a scanning optical system, and the surface of the photoconductor is scanned with the beam spot. Recently, in a multi-color image forming apparatus such as a color laser printer, a digital color copier, etc., a method of optically scanning surfaces of plural photoconductors simultaneously has been adopted to improve productivity of the apparatus. An optical scanning device adopting such a method of simultaneously scanning surfaces of plural photoconductors includes a scanning optical system for each of the plural photoconductors. Accordingly, the number of optical elements in the optical scanning device is proportional to the number of the photoconductors, so that the number of parts in the optical scanning device inevitably increases.

As an optical scanning device employing such a method of simultaneously scanning surfaces of plural photoconductors, a so-called opposed type optical scanning device performing optical scanning at both sides of a single rotating deflecting device is described in Japanese Patent Laid-open publication No. 2002-196271 and Japanese Patent publication No. 3124741.

In an opposed type optical scanning device configured to simultaneously scan surfaces of plural photoconductors, generally, as many scanning optical systems as the plural photoconductors are arranged in a single optical housing to perform optical scanning relative to surfaces of the plural photoconductors, respectively. The single rotating deflecting device is provided with dual reflecting surfaces (upper and lower reflecting surfaces) to decrease space, and scanning optical systems, which are independent from each other, are arranged relative to each of the upper and lower deflecting surfaces of the single deflecting device. Further, because the scanning optical systems are arranged independent from each other, in each of the scanning optical systems, one or more folding-back mirrors are arranged upstream of a scanning lens in the direction in which an optical beam travels. Such an opposed type optical scanning device using a single deflecting device is advantageous in cost when compared to an optical scanning device using a plurality of deflecting devices. However, the opposed type optical scanning device is still relatively expensive because as many scanning optical systems as plural photoconductors are necessary, and thereby as many optical elements as the scanning optical systems are necessary.

A scanning optical system of an optical scanning device includes optical elements such as an fθ lens as a scanning lens, plural folding-back mirrors, and a long lens (toroidal lens) as a scanning lens having power in a sub-scanning direction. The arrangement of these optical elements in the optical scanning device and the performance of the optical elements greatly influence the quality of an image formed by an image forming apparatus using the optical scanning device.

For example, in an optical scanning device simultaneously scanning surfaces of plural photoconductors, it is important to always keep uniform curvatures in scanning lines formed on the plural photoconductors. If geometrical characteristics of scanning lines formed on the plural photoconductors are not uniform among the plural photoconductors, when images formed on the plural photoconductors are sequentially transferred, for example, onto a recording sheet while being superimposed on top of another on the recording sheet, the images are not superimposed with each other correctly, so that the quality of a resulting image formed on the recording sheet deteriorates. In particular, in a color image forming apparatus in which latent images on plural photoconductors are developed with toner of different color from each other, due to color deviation caused by such deviations in scanning lines on the plural photoconductors, color reproducibility greatly deteriorates.

Generally, in a scanning optical system of an optical scanning device, a scanning lens having power in the sub-scanning direction, which is usually a long lens, has dominant influence on such scanning line curvature on a photoconductor. That is, in a scanning lens, when focus lines forming an optical axis center of the scanning lens are not parallel to an attachment side of the scanning lens, scanning line curvature is caused on a photoconductor. Focus line curvature in a lens is inevitably caused by a limit in processing the lens with molding, and if the focus line curvature in the lens can be decreased at all, it is likely that the cost of processing the lens will increase.

In particular, recently, resin lenses have been widely used because of such merits as low cost and that a freely curved surface can be formed. In a resin lens, however, due to internal distortion of the lens when molding the lens with a mold and unevenness in temperature of the mold, the above-described focus line curvature is more remarkably caused than in a glass lens.

In an opposed type optical scanning device, it is also important to make uniform characteristics of beam spots on plural photoconductors. Even slight differences in the beam spot characteristics among the plural photoconductors can cause deterioration in the quality of a resultant image, for example deterioration in the color reproducibility and the color evenness. Here, the beam spot characteristics on a photoconductor include not only the beam spot diameter but also the beam strength (light quantity) and the beam spot position (imaging position) on the photoconductor, so that to make uniform the beam spot characteristics on plural photoconductors, it is important to perform uniform optical scanning relative to the plural photoconductors. Deterioration in the beam spot characteristics on a photoconductor may be caused, for example, by deformation at parts of an optical housing where optical elements are mounted, which may be caused by thermal expansion arising from a rise in temperature in the optical housing, and by deviations in beam incident positions relative to the optical elements.

It is also well known that in an optical scanning device, the beam spot diameter and beam spot position on a photoconductor are greatly influenced by a beam incident position relative to a scanning lens. Therefore, when a folding-back mirror is arranged upstream of the scanning lens as in the above-described opposed type optical scanning device, very high dimensional accuracy is required in the mounting surface of an optical housing where the folding-back mirror is mounted. This leads to increasing parts cost of the optical scanning device.

SUMMARY OF THE INVENTION

The present invention has been made in views of the above-discussed and other problems and addresses the above-discussed and other problems.

Preferred embodiments of the present invention provide a novel opposed type optical scanning device enabling a high quality image to be obtained with a relatively simple configuration and at a relatively low cost, and a novel image forming apparatus using the optical scanning device.

According to a preferred embodiment of the present invention, an optical scanning device for scanning surfaces of an even number of pieces of photoconductors simultaneously includes a housing, a rotating deflecting device arranged substantially at a center in the housing to deflect optical beams, and a plurality of scanning optical systems corresponding to the even number of pieces of photoconductors, arranged to be substantially symmetrical with the rotating deflecting device as the symmetry center. The plurality of scanning optical systems include a plurality of folding-back mirrors and at least one long lens having power in a sub-scanning direction, respectively, and pluralities of the folding-back mirrors and the at least one long lenses of the symmetrically arranged scanning optical systems of the plurality of scanning optical systems are arranged to be symmetrical to each other with the rotating deflecting device as the symmetry center, respectively. The surfaces of the even number of pieces of photoconductors are simultaneously scanned with the optical beams deflected by the rotating deflecting device through the intermediary of the plurality of scanning optical systems. In each of the symmetrically arranged scanning optical systems of the plurality of scanning optical systems, a same number of folding-back mirrors of the plurality of folding-back mirrors is arranged downstream of the at least one long lens in a direction in which an optical beam deflected by the rotating deflecting device travels, and at least one long lens of the symmetrically arranged scanning optical systems is arranged in respective scanning planes reversed relative to each other.

Thereby, in scanning optical systems of the plurality of scanning optical systems, arranged to be symmetrical to each other with the rotating deflecting device as the symmetry center, the directions in which scanning line curvatures are convex on respective photoconductors can be made uniform, so that deviations in beam spot positions on the photoconductors, which lead to color deviations in a resulting image, are suppressed and high image quality is maintained.

According to another preferred embodiment of the present invention, an optical scanning device for scanning surfaces of an even number of pieces of photoconductors simultaneously includes a housing, a rotating deflecting device arranged substantially at a center in the housing to deflect optical beams, and a plurality of scanning optical systems corresponding to the even number of pieces of photoconductors, arranged to be symmetrical with the rotating deflecting device as the symmetry center. The plurality of scanning optical systems include a plurality of folding-back mirrors and at least one long lens having power in a sub-scanning direction, respectively, and the pluralities of folding-back mirrors and the at least one long lenses of the symmetrically arranged scanning optical systems of the plurality of scanning optical systems are arranged to be symmetrical to each other with the rotating deflecting device as the symmetry center, respectively. The surfaces of the even number of pieces of photoconductors are simultaneously scanned with the optical beams deflected by the rotating deflecting device through the intermediary of the plurality of scanning optical systems. In scanning optical systems of the plurality of scanning optical systems, arranged in a position nearer the rotating deflecting device and in a position farther from the rotating deflecting device, respectively, at either side of the rotating deflecting device, respective of the at least one long lenses are arranged in respective scanning planes reversed relative to each other, and a difference between the scanning optical systems in numbers of folding-back mirrors of the plurality of folding-back mirrors, arranged downstream of the respective at least one long lenses in directions in which optical beams deflected by the rotating deflecting device travel, is 2N−1, wherein N is a natural number.

Thereby, the directions in which scanning line curvatures are convex on the plurality of photoconductors can be made uniform on all of the photoconductors, so that deviations in beam spot positions on the photoconductors, which lead to color deviations in a resulting image, are suppressed and high image quality is maintained.

In each of the above-described optical scanning devices, the at least one long lens included in each of the plurality of scanning optical systems may be a molded article of resin. In this case, even if a focus line curvature may have been caused in the long lens in molding thereof and the focus line curvature of the long lens may have caused a scanning line curvature on a photoconductor, adverse influences of the scanning line curvature on the photoconductor on a resulting image are suppressed as described. Therefore, by using relatively inexpensive resin lenses for the long lenses, cost reduction can be achieved.

According to still another preferred embodiment of the present invention, an optical scanning device for scanning surfaces of an even number of pieces of photoconductors simultaneously includes a housing, a rotating deflecting device arranged substantially at a center in the housing to deflect optical beams, and a plurality of scanning optical systems corresponding to the even number of pieces of photoconductors, arranged to be substantially symmetrical with the rotating deflecting device as the symmetry center. The plurality of scanning optical systems include a plurality of folding-back mirrors and at least one long lens having power in a sub-scanning direction, respectively, and the pluralities of folding-back mirrors and the at least one long lenses of the symmetrically arranged scanning optical systems of the plurality of scanning optical systems are arranged to be symmetrical to each other with the rotating deflecting device as the symmetry center, respectively. The surfaces of the even number of pieces of photoconductors are simultaneously scanned with the optical beams deflected by the rotating deflecting device through the intermediary of the plurality of scanning optical systems. In the symmetrically arranged scanning optical systems of the plurality of scanning optical systems, distances between respective pluralities of folding-back mirrors, arranged to be symmetrical to each other, respectively, and distances between reflecting parts of the rotating deflecting device and adjacent folding-back mirrors of the respective pluralities of folding-back mirrors are equal, respectively.

Thereby, in symmetrically arranged scanning optical systems of the plurality of scanning optical systems, scanning widths of folding-back mirrors that are symmetrically arranged can be made equal. Accordingly, a common part can be used for each of the symmetrically arranged folding-back mirrors, and thereby cost reduction can be realized.

The optical scanning device described immediately above may be configured such that in the symmetrically arranged scanning optical systems of the plurality of scanning optical systems, at least one pair of folding-back mirrors of the respective pluralities of folding-back mirrors, arranged to be symmetrical to each other, are arranged such that angles formed by incident light rays and reflecting light rays at respective surfaces of the at least one pair of folding-back mirrors are equal. Thereby, in symmetrically arranged scanning optical systems, reflection coefficients of at least one pair of folding back-mirrors, arranged to be symmetrical to each other, can be made equal. Therefore, it is not necessary to change the coating conditions for each of the pair of folding-back mirrors, so that cost reduction can be realized.

Further, the optical scanning device described immediately above may be configured such that in the plurality of scanning optical systems, distances from last folding-back mirrors of respective pluralities of folding-back mirrors, which lastly guide the optical beams deflected by the rotating deflecting device to the surfaces of the even number of pieces of photoconductors, respectively, to the surfaces of the even number of pieces of photoconductors are equal. Thereby, a common part may be used for each of the last folding-back mirrors of respective pluralities of folding-back mirrors, so that cost reduction can be realized.

According to still another preferred embodiment of the present invention, an optical scanning device for scanning surfaces of an even number of pieces of photoconductors simultaneously includes a housing, a rotating deflecting device arranged substantially at a center in the housing to deflect optical beams, and a plurality of scanning optical systems corresponding to the even number of pieces of photoconductors, arranged to be substantially symmetrical with the rotating deflecting device as the symmetry center. The plurality of scanning optical systems include a plurality of folding-back mirrors and at least one long lens having power in a sub-scanning direction, respectively, and the pluralities of folding-back mirrors and at the least one long lenses of the symmetrically arranged scanning optical systems of the plurality of scanning optical systems are arranged to be symmetrical to each other with the rotating deflecting device as the symmetry center, respectively. The surfaces of the even number of pieces of photoconductors are simultaneously scanned with the optical beams deflected by the rotating deflecting device through the intermediary of the plurality of scanning optical systems. In each of scanning optical systems of the plurality of scanning optical systems, arranged to be symmetrical to each other with the rotating deflecting device as the symmetry center at positions farther from the rotating deflecting device at both sides of the rotating deflecting device, all of the plurality of folding-back mirrors are arranged downstream of the at least one long lens in a direction in which an optical beam deflected by the rotating deflecting device travels.

Thereby, adverse influence which, when one or more folding-back mirrors are arranged at the upstream side of the long lens, might be caused on the light ray incident position on the long lens by changes in the attaching positions of the one of more folding-back mirrors is nil. Accordingly, in scanning optical systems of the plurality of scanning optical systems, arranged to be symmetrical to each other with the rotating deflecting device as the symmetry center at positions farther from the rotating deflecting device at both sides of the rotating deflecting device, variations in the light ray incident positions on the long lenses can be decreased, so that deteriorations in the beam spot characteristics on photoconductors are avoided and high image quality is maintained.

Further, the optical scanning device described immediately above may be configured such that in each of scanning optical systems of the plurality of scanning optical systems, arranged to be symmetrical to each other with the rotating deflecting device as the symmetry center at positions near the rotating deflecting device at both sides of the rotating deflecting device, one of the plurality of folding-back mirrors is arranged upstream of the at least one long lens in a direction in which an optical beam deflected by the rotating deflecting device travels. Thereby, adverse influence which, when one or more folding-back mirrors are arranged upstream of the long lens, may be caused on the light ray incident position on the long lens by a change in the attaching position of the one or more folding-back mirrors can be suppressed to a minimum. Accordingly, in scanning optical systems of the plurality of scanning optical systems, arranged to be symmetrical to each other with the rotating deflecting device as the symmetry center at positions nearer the rotating deflecting device at both sides of the rotating deflecting device, variations in the light ray incident positions on the long lenses can be decreased, and thereby deteriorations in the beam spot characteristics on photoconductors can be avoided.

Further, the one of the plurality of folding-back mirrors arranged upstream of the at least one long lens may be wider in a short side thereof than the others of the plurality of folding-back mirrors. Thereby, alignment of the light receiving surface of the one of the plurality of folding-back mirrors arranged upstream of the at least one long lens can be made more precise. Accordingly, in scanning optical systems of the plurality of scanning optical systems, arranged to be symmetrical to each other with the rotating deflecting device as the symmetry center at positions nearer the rotating deflecting device at both sides of the rotating deflecting device, variations in the light ray incident positions on the long lenses due to tilting of respective folding-back mirrors arranged upstream of the long lenses can be suppressed, so that deteriorations in the beam spot characteristics on photoconductors are suppressed and high image quality is maintained.

Furthermore, in each of the above-described optical scanning devices, the number of respective pluralities of folding-back mirrors in the plurality of scanning optical systems may be equal. Thereby, deviation in cumulated reflection coefficients of folding-back mirrors among the yellow, cyan, magenta, and black scanning optical systems can be suppressed to a minimum, so that differences in beam strengths (light quantities) on surfaces of photoconductors and in beam strength deviations (shading) in scanning lines on the surfaces of the photoconductors can be suppressed. As a result, density unevenness and color unevenness can be avoided in toner images of respective colors formed on the photoconductors.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
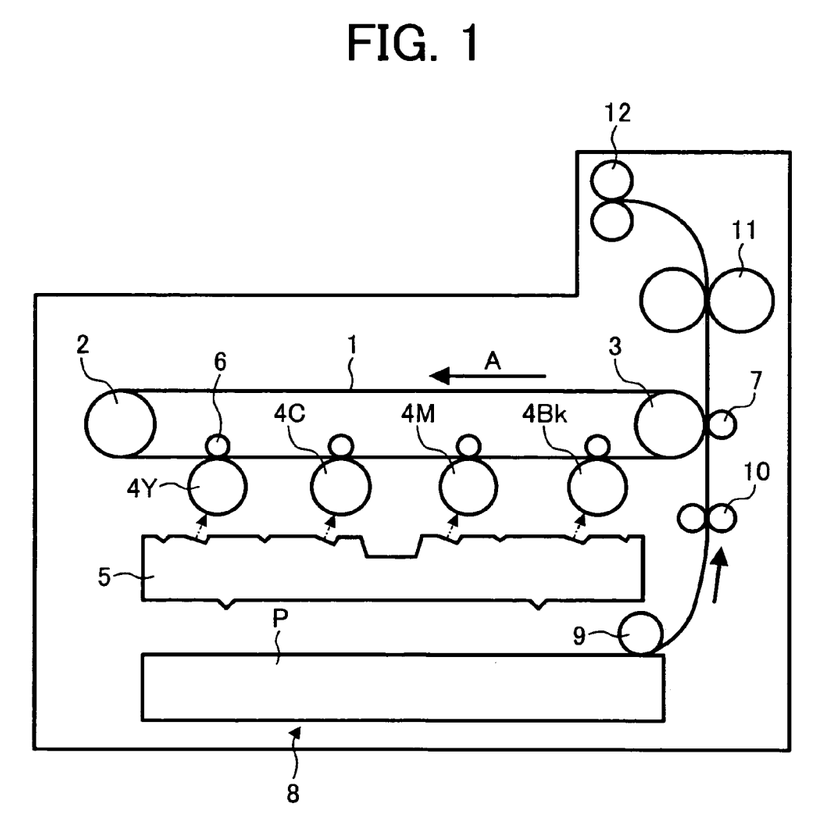
FIG. 1 is a diagram schematically illustrating an image forming apparatus according to a preferred embodiment of the present invention.

Referring now to the drawings, wherein like reference numerals designate identical or corresponding parts throughout the several views, FIG. 1 is a diagram schematically illustrating an image forming apparatus according to a preferred embodiment of the present invention.

The image forming apparatus includes an intermediary transfer belt 1 as an image bearing member. The intermediary transfer belt 1 is spanned around rollers 2 and 3, and is driven to travel in the arrow direction A by driving one of the rollers 2 and 3 to rotate in the counterclockwise direction in FIG. 1. Drum-like shaped photoconductors 4Y, 4C, 4M, and 4Bk are arranged, in parallel to each other, along a lower side of the intermediary transfer belt 1, and a yellow toner image, a cyan toner image, a magenta toner image, and a black toner image are formed on the photoconductors 4Y, 4C, 4M, and 4Bk, respectively.

The photoconductors 4Y, 4C, 4M, and 4Bk are driven to rotate in the clockwise direction in FIG. 1, respectively, surfaces of the photoconductors 4Y, 4C, 4M, and 4Bk are charged to predetermined polarities with charging devices (not shown), and the charged surfaces of the photoconductor 4Y, 4C, 4M, and 4Bk are illuminated by optically modulated beams emitted from an optical scanning device 5 arranged below the photoconductors 4Y, 4C, 4M, and 4Bk. Thereby, electrostatic latent images are formed on the photoconductor 4Y, 4C, 4M, and 4Bk, and the electrostatic images are visualized with development devices (not shown) to toner images of respective colors on the photoconductors 4Y, 4C, 4M, and 4Bk. For example, a yellow toner image is formed on the photoconductor 4Y.

The yellow toner image formed on the photoconductor 4Y is transferred onto the intermediary transfer belt 1 by applying a voltage of a polarity opposite to that of toner to a transfer roller 6, which is arranged to sandwich the intermediary transfer belt 1 with the photoconductor 4Y. In substantially the same manner, a cyan toner image, a magenta toner image, and a black toner image formed on the photoconductors 4C, 4M, and 4Bk are sequentially transferred onto the intermediary transfer belt 1 onto which the yellow toner image has been transferred to be superimposed on top of another. A toner image consisting of superimposed toner images thus formed on the intermediary transfer belt 1 is moved with traveling of the intermediary transfer belt 1 to a secondary transfer part where a secondary transfer roller 7 is arranged.

A sheet feed part 8 is arranged at a lower part of the main body of the apparatus, and a recording member P such as a transfer sheet is conveyed by a feed device 9 from the sheet feed part 8 in the arrow direction in FIG. 1. The recording member P impinges on a registration roller 10, and thereafter, the recording member P is conveyed to the secondary transfer part of the intermediary transfer belt 1 in a timing that the toner image on the intermediary transfer belt 1 is correctly transferred onto the recording member P. A voltage of a polarity opposite to that of toner on the intermediary transfer belt 1 is applied to the secondary transfer roller 7, and thereby the toner image on the intermediary transfer belt 1 is transferred onto the recording member P. The recording member P on which the toner image has been transferred is conveyed to a fixing device 11, where the toner image on the recording member P is fixed to the recording member P. The recording member P is then discharged onto a discharge part at the upper surface of the main body by a discharge roller 12. Soil such as toner remaining on the photoconductors 4Y, 4C, 4M, and 4Bk and the intermediary transfer belt 1 is removed with respective cleaning devices (not shown).

Figure 2:
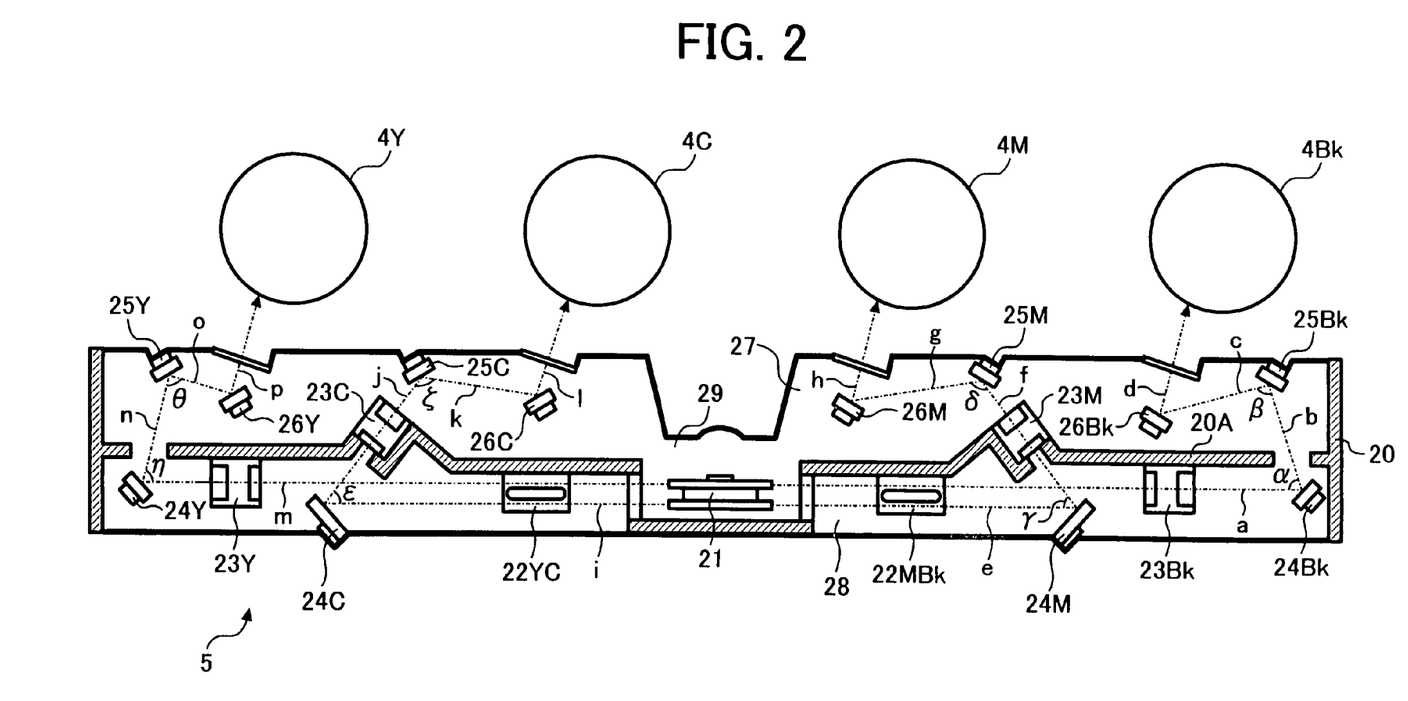
FIG. 2 is a cross section of an optical scanning device according to a preferred embodiment of the present invention.

FIG. 2 is a cross section of the optical scanning device 5 as an optical scanning device according to a preferred embodiment of the present invention. As illustrated in FIG. 2, the optical scanning device 5 includes a single optical housing 20, and a base plate 20A is provided substantially at the center of the optical housing 20 in the vertical direction such that the optical housing 20 is partitioned into an upper space 27 and a lower space 28 by the base plate 20A. A concavity is formed substantially at the center of the base plate 20A such that the bottom of the concavity reaches the bottom of the lower space 28 (the bottom of the optical housing 20). Thereby, a concave part 29 is formed substantially at the center of the upper space 27, that is, substantially at the center in the optical housing 20. A polygon mirror 21 as a two-step rotating deflecting device having dual reflecting surfaces (upper and lower reflecting surfaces) is arranged in the concave part 29, so that the polygon mirror 21 is substantially at the center in the optical housing 20. Scanning optical systems corresponding to the photoconductors 4Y, 4C, 4M, and 4Bk are arranged in the optical housing 20 such that respective surfaces of the photoconductors 4Y, 4C, 4M, and 4Bk are scanned with optical beams deflected by the polygon mirror 21 through the intermediary of the scanning optical systems.

Specifically, a yellow scanning optical system relative to the photoconductor 4Y and a cyan scanning optical system relative to the photoconductor 4C are arranged at the left side of the polygon mirror 21 in FIG. 2. The yellow scanning optical system includes an fθ lens 22YC, a long lens 23Y, and first, second, and third folding-back mirrors 24Y, 25Y, and 26Y. The cyan scanning optical system includes the fθ lens 22YC, a long lens 23C, and first, second, and third folding-back mirrors 24C, 25C, and 26C. A magenta scanning optical system relative to the photoconductor 4M and a black scanning optical system relative to the photoconductor 4Bk are arranged at the right side of the polygon mirror 21 in FIG. 2. The magenta scanning optical system includes an fθ lens 22MBk, a long lens 23M, and first, second, and third folding-back mirrors 24M, 25M, and 26M. The black scanning optical system includes the fθ lens 22MBk, a long lens 23Bk, and first, second, and third folding-back mirrors 24Bk, 25Bk, and 26Bk.

The polygon mirror 21 is formed in a regular polygon and has reflecting mirrors at side surfaces thereof. The polygon mirror 21 is driven by a motor (not shown) at a high speed to deflect optical beams from a light source (not shown). The fθ lenses 22YC and 22MBk are optical elements to convert equiangular movement of the deflected optical beams to constant velocity linear movement. Each of the fθ lenses 22YC and 22MBk is formed in a two layer. The first, second, and third folding-back mirrors 24Y, 25Y, and 26Y are optical elements to guide an optical beam corresponding to yellow to the photoconductor 4Y. Similarly, the first, second, and third folding-back mirrors 24C, 25C, and 26C are optical elements to guide an optical beam corresponding to cyan to the photoconductor 4C, the first, second, and third folding-back mirrors 24M, 25M, and 26M are optical elements to guide an optical beam corresponding to magenta to the photoconductor 4M, and the first, second, and third folding-back mirrors 24Bk, 25Bk, and 26Bk are optical elements to guide an optical beam corresponding to black to the photoconductor 4Bk. The long lenses 23Y, 23C, 23M, and 23Bk are optical elements having a function to correct deviation in positions of scanning lines in the sub-scanning direction on the photoconductors 4Y, 4C, 4M, and 4Bk, which is caused by surface tilts of the polygon mirror 21. The optical beam corresponding to yellow, for example, is deflected by the polygon mirror 21 and is guided to the surface of the photoconductor 4Y via the fθ lens 22YC, the long lens 23Y, and the first, second, and third folding-back mirrors 24Y, 25Y, and 26Y of the yellow scanning optical system.

As illustrated in FIG. 2 and described above, two scanning optical systems are arranged at each side of the polygon mirror 21. Specifically, the yellow scanning optical system and the cyan scanning optical system are arranged at the left side of the polygon mirror 21 in FIG. 2 with the cyan scanning optical system at the internal side (i.e., at the side near the polygon mirror 21) and the yellow scanning optical system at the outer side (i.e., at the side farther from the polygon mirror 21) in the optical housing 20. The magenta scanning optical system and the black scanning optical system are arranged at the right side of the polygon mirror 21 in FIG. 2 with the magenta scanning optical systems at the internal side and the black scanning optical system at the outer side in the optical housing 20. Thus, the cyan scanning optical system and the magenta optical scanning system are located at the internal side in the optical housing 20, and the yellow scanning optical system and the black scanning optical systems are located at the outer side in the optical housing 20.

The cyan scanning optical system and the magenta scanning optical system at the internal side are arranged to be symmetrical to each other with the polygon mirror 21 as the symmetry center. That is, optical elements of the cyan scanning optical system and those of the magenta scanning optical system are arranged to be symmetrical to each other with the polygon mirror 21 as the symmetry center. Similarly, the yellow scanning optical system and the black scanning optical system at the outer side are arranged to be symmetrical to each other with the polygon mirror 21 as the symmetry center. That is, optical elements of the yellow scanning optical system and those of the black scanning optical system are arranged to be symmetrical to each other with the polygon mirror 21 as the symmetry center.

Further, with respect to the cyan scanning optical system and the magenta scanning optical system at the internal side, respective distances from the polygon mirror 21 of the fθ lens 22YC, the long lens 23C, the first folding-back mirror 24C, the second folding-back mirror 25C, and the third folding-back mirror 26C in the cyan scanning optical system and respective distances from the polygon mirror 21 of the fθ lens 22MBk, the long lens 23M, the first folding-back mirror 24M, the second folding-back mirror 25M, and the third folding-back mirror 26M in the magenta scanning optical system are made equal. Similarly, with respect to the yellow scanning optical system and the black scanning optical system at the outer side, respective distances from the polygon mirror 21 of the fθ lens 22YC, the long lens 23Y, the first folding-back mirror 24Y, the second folding-back mirror 25Y, and the third folding-back mirror 26Y in the yellow scanning optical system and respective distances from the polygon mirror 21 of the fθ lens 22MBk, the long lens 23Bk, the first folding-back mirror 24Bk, the second folding-back mirror 25Bk, and the third folding-back mirror 26Bk in the black scanning optical system are made equal. In each of the cyan, magenta, yellow and black scanning optical systems, three folding-back mirrors, i.e., the first folding-back mirror 24(Y, C, M, Bk), the second folding-back mirror 25(Y, C, M, Bk), and the third folding-back mirror 26(Y, C, M, Bk), are arranged between the polygon mirror 21 and the surface of a corresponding photoconductor.

Figure 3A:
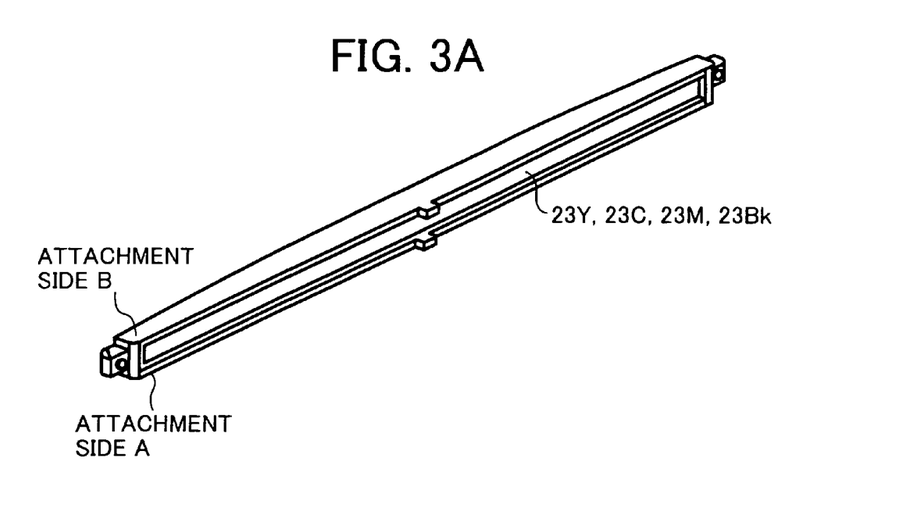
FIG. 3A is a perspective view of a long lens used in the optical scanning device.
Figure 3B:
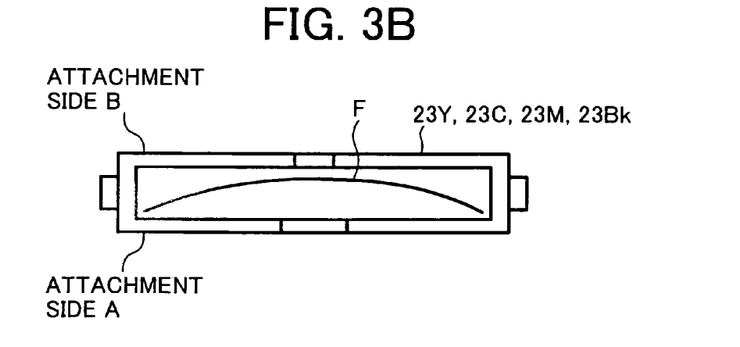
FIG. 3B is diagram explaining the long lens.
Figure 3C:
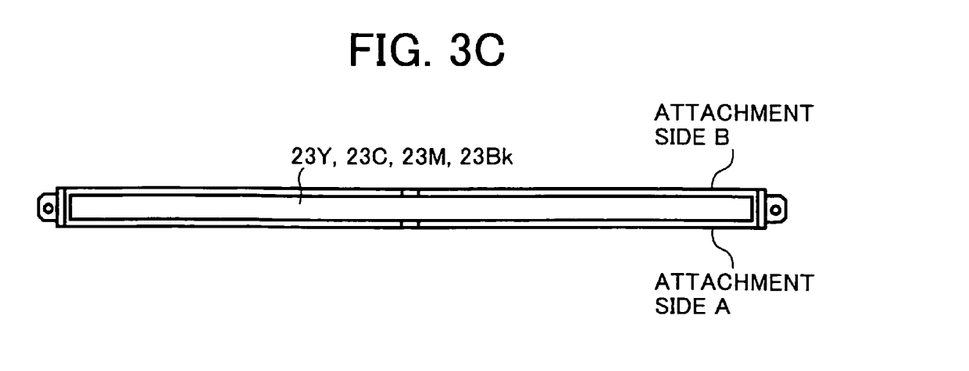
FIG. 3C is a front view of the long lens.

The long lenses 23Y, 23C, 23M, and 23Bk have larger power in the sub-scanning direction, and are formed with resin material by molding. As described above, a focus line curvature is easily caused in a resin lens. Here, as illustrated in FIG. 3B, it is assumed that the long lens 23(Y, C, M, Bk) has a focus line curvature F convex upward when the attachment side A is on the downside. The long lens 23(Y, C, M, Bk) has attachment sides at both of the upper and bottom sides thereof, i.e., an attachment side A and an attachment side B, so that the long lens 23(Y, C, M, Bk) can be arranged arbitrarily reversed (i.e., the attachment side B is on the downside) in a scanning plane of each scanning optical system. When the long lens 23(Y, C, M, Bk) is reversed (i.e., the attachment side B is on the downside), the focus line curvature F is convex downward.

Figure 4:
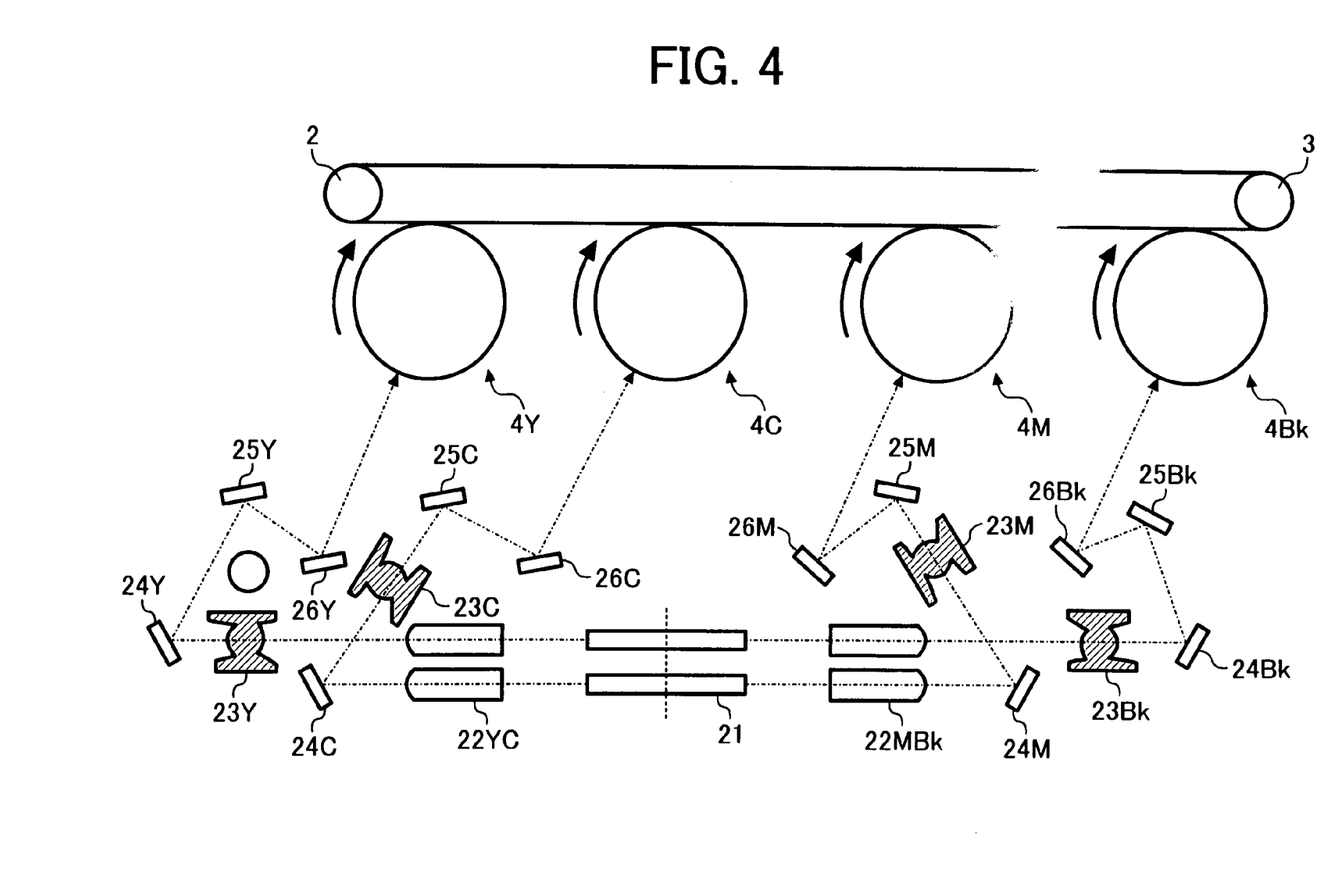
FIG. 4 is a diagram explaining a relation between the arrangement of long lenses in the optical scanning device and focus line curvatures of the long lenses.
Figure 5:
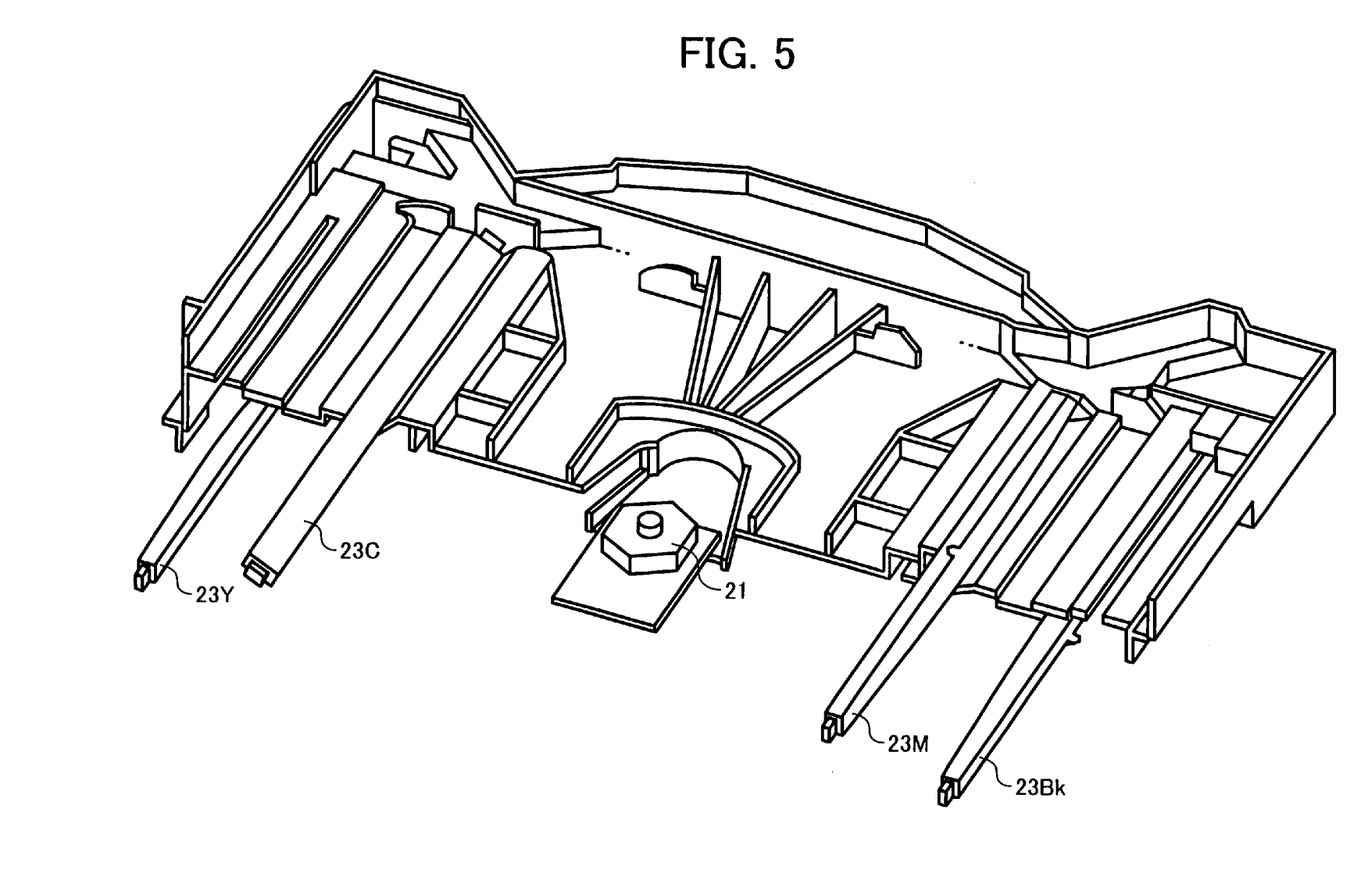
FIG. 5 is a perspective view explaining the arrangement of the long lenses in the optical scanning device.

When the long lens 23(Y, C, M, Bk) has such a focus line curvature F as described above, for example with respect to the cyan scanning optical system and the magenta scanning optical system, symmetrically arranged at the internal side with the polygon mirror 21 as the symmetry center, as illustrated in FIG. 4 and FIG. 5, in the magenta scanning optical system the long lens 23M is arranged such that the attachment side A is on the downside, and in the cyan scanning optical system the long lens 23C is arranged such that the attachment side B is on the downside (the attachment side A is on the upside). Further, the number of folding-back mirrors arranged downstream of the long lens 23M in the direction in which an optical beam deflected by the polygon mirror 21 travels in the magenta scanning optical system and the number of folding-back mirrors arranged downstream of the long lens 23C in the direction in which an optical beam deflected by the polygon mirror 21 travels in the cyan scanning optical system are equal (in this example, two mirrors, respectively). Thereby, scanning line curvatures on the photoconductors 4C and 4M are made both convex downward, so that the scanning line curvatures in cyan and magenta toner images on the photoconductors 4C and 4M are uniform. In each of cross sections of the long lenses 23C and 23M in FIG. 4, the longer width side is the attachment side A.

Similarly, in the yellow scanning optical system and the black scanning optical system, symmetrically arranged at the outer side with the polygon mirror 21 as the symmetry center, by arranging the long lenses 23Y and 23Bk in respective scanning planes reversed relative to each other and by making equal the numbers of folding-back mirrors arranged downstream of the long lens 23Y and the long lens 23Bk, respectively (in this example, three mirrors, respectively), scanning line curvatures on the photoconductors 4Y and 4Bk are made uniform.

Thus, in scanning optical systems symmetrically arranged with the polygon mirror 21 as the symmetry center, by arranging long lenses reversed relative to each other in respective scanning planes and making equal the numbers of folding-back mirrors arranged downstream of the long lenses, the directions of scanning line curvatures on respective photoconductors can be made uniform, and thereby deviations in beam spot positions on the photoconductors and resulting color deviations in an image can be decreased.

Further, in the scanning optical systems at the right side of the polygon mirror 21 (the magenta scanning optical system and the black scanning optical system) and those at the left side of the polygon mirror 21 (the yellow scanning optical system and the cyan scanning optical system), the long lenses 23M and 23Bk (at the right side) and the long lenses 23Y and 23C (at the left side) are arranged reversed relative to each other in scanning planes, respectively, and the difference in the numbers of folding-back mirrors arranged downstream of the long lenses 23M and 23Bk (at the right side) and the difference in the numbers of folding-back mirrors arranged downstream of the long lenses 23Y and 23C (at the left side) are selected to be 2N−1 (N being a natural number), respectively.

That is, as illustrated in FIG. 4, in the magenta scanning optical system at the internal side at the right side, the long lens 23M is arranged with the attachment side A on the downside, and in the cyan scanning optical system at the internal side at the left side, the long lens 23C is arranged with the attachment side B (the opposite side of the attachment side A) on the downside, and two folding-back mirrors are arranged downstream of the long lenses 23M and 23C, respectively, i.e., the second and third folding-back mirrors 25M and 26M in the magenta scanning optical system, and the second and third folding-back mirrors 25C and 26C in the cyan scanning optical system. In the black scanning optical system at the outer side at the right side, the long lens 23Bk is arranged with the attachment side A on the downside. This is because a folding-back mirror (the first folding-back mirror 24M) exists between the fθ lens 22MBk and the long lens 23M in the magenta scanning optical system and a folding-back mirror does not exists between the fθ lens 22MBk and the long lens 23Bk in the black scanning optical system. The long lens 23Bk is attached to the rear side of the base plate 20A (see FIG. 2) with the attachment side B as the attachment side to the base plate 20A. Similarly, in the yellow scanning optical system at the outer side at the left side, the long lens 23Y is arranged with the attachment side B on the downside. Further, in the yellow scanning optical system and the black scanning optical system at the outer side, the numbers of folding-back mirrors arranged downstream of the long lenses 23Bk and 23Y are selected to be three, respectively. That is, the difference in the numbers of folding-back mirrors arranged downstream of long lenses between scanning optical systems arranged at one side of the polygon mirror 21 is: 3−2=1. In FIG. 4, the attachment side B of the long lens 23Y in the yellow scanning optical system is directed downward and the attachment side B of the long lens 23C in the cyan scanning optical system is directed toward the lower right. However, in the cyan scanning optical system, a scanning line curvature is reversed by the first folding-back mirror 24C, so that it is equivalent to the long lens 23C being reversed relative to the long lens 23Y.

With the above-described configuration, scanning line curvatures on the photoconductors 4Y, 4C, 4M, and 4Bk can be all made convex downward, so that scanning line curvatures in yellow, cyan, magenta, and black toner images on the photoconductors 4Y, 4C, 4M, and 4Bk can be made uniform.

Thus, directions of scanning line curvatures in the yellow, cyan, magenta, and black scanning optical systems can be made uniform, so that deviations in beam spot positions on the photoconductors 4Y, 4C, 4M, and 4Bk and resulting color deviations in an image can be decreased.

Further, the optical scanning device 5 is configured in such a way that in scanning optical systems symmetrically arranged at the internal side and at the outer side, distances between folding-back mirrors (including reflecting parts of the polygon mirror 21) are equal, respectively. Specifically, as illustrated in FIG. 2, with respect to the cyan scanning optical system and the magenta scanning optical system, arranged at the internal side, a distance "i" from a reflecting part of the polygon mirror 21 to the first folding-back mirror 24C in the cyan scanning optical system and a distance "e" from a reflecting part of the polygon mirror 21 to the first folding-back mirror 24M in the magenta scanning optical system are equal (i.e., i=e), a distance "j" from the first folding-back mirror 24C to the second folding-back mirror 25C in the cyan scanning optical system and a distance "f" from the first folding-back mirror 24M to the second folding-back mirror 25M in the magenta scanning optical system are equal (i.e., j=f), and a distance "k" from the second folding-back mirror 25C to the third folding-back mirror 26C in the cyan scanning optical system and a distance "g" from the second folding-back mirror 25M to the third folding-back mirror 26M in the magenta scanning optical system are made equal (i.e., k=g). Thus, in scanning optical systems symmetrically arranged with the polygon mirror 21 as the symmetry center, respective distances between folding-back mirrors including reflecting parts of the polygon mirror 21 are made equal, so that scanning widths of folding-back mirrors that are symmetrically arranged can be made equal. That is, in the cyan scanning optical system and the magenta scanning optical system, arranged at the internal side, the first folding-back mirrors 24C and 24M, the second folding-back mirrors 25C and 25M, and the third folding-back mirrors 26C and 26M can be common elements, respectively. Similarly, in the yellow scanning optical system and the black scanning optical system, symmetrically arranged at the outer side, distances from reflecting parts of the polygon mirror 21 to the first folding-back mirrors 24Y and 24Bk ("m", "a"), distances from the first folding-back mirrors 24Y and 24Bk to the second folding-back mirrors 25Y and 25Bk ("n", "b"), and distances from the second folding-back mirrors 25Y and 25Bk to the third folding-back mirrors 26Y and 26Bk ("o", "c") are equal (i.e., m=a, n=b, o=c). Thereby, the first folding-back mirrors 24Y and 24Bk, the second folding-back mirrors 25Y and 25Bk, and the third folding-back mirrors 26Y and 26Bk can be common elements, respectively.

Thus, the optical scanning device 5 in this embodiment includes twelve folding-back mirrors in total, six pairs of symmetrically arranged folding-back mirrors, and folding-back mirrors of each of the six pairs can have commonality at least in longitudinal length.

Further, in the scanning optical systems symmetrically arranged with the polygon mirror 21 as the symmetry center, angles formed by light rays at surfaces of symmetrically arranged folding-back mirrors are equal, respectively. For example, in FIG. 2, in the cyan scanning optical system and the magenta scanning optical system, which are symmetrically arranged at the internal side, an angle "ε" formed by an incident light ray and a reflecting light ray at the first folding-back mirror 24C in the cyan scanning optical system and an angle "γ" formed by an incident light ray and a reflecting light ray at the first folding-back mirror 24M in the magenta scanning optical system are equal, and an angle "ζ" formed by an incident light ray and a reflecting light ray at the second folding-back mirror 25C in the cyan scanning optical system and an angle "δ" formed by an incident light ray and a reflecting light ray at the second folding-back mirror 25M in the magenta scanning optical are equal (i.e., ε=γ, ζ=δ). Further, reflection coefficients of the first folding-back mirrors 24C and 24M and reflection coefficients of the second folding-back mirrors 25C and 25M are identical, respectively. Thereby, with respect to symmetrically arranged folding-back mirrors, it is not necessary to change coating conditions for each of the symmetrically arranged folding-back mirrors. Similarly, in the yellow scanning optical system and the black scanning optical system, symmetrically arranged at the outer side, angles formed by incident light rays and reflecting light rays at the first folding-back mirrors 24Y and 24Bk and at the second folding-back mirrors 25Y and 25Bk are equal, respectively (i.e., η=α, θ=β).

That is, in the optical scanning device 5 configured as described above, for folding-back mirrors that are symmetrically arranged, parts having the same length and the same reflection coefficient can be used.

Furthermore, the optical scanning device 5 is configured in such a way that in the yellow, cyan, magenta, and black scanning optical systems, distances from the last folding-back mirrors (i.e., the third folding-back mirrors 26Y, 26C, 26M, and 26Bk), which lastly guide optical beams to surfaces of corresponding photoconductors, to the surfaces of the corresponding photoconductors are equal. That is, in FIG. 2, a distance "p" from the third folding-back mirror 26Y to the photoconductor 4Y in the yellow scanning optical system, a distance "l" from the third folding-back mirror 26C to the photoconductor 4C in the cyan scanning optical system, a distance "h" from the third folding-back mirror 26M to the photoconductor 4M in the magenta scanning optical system, and a distance "d" from the third folding-back mirror 26Bk to the photoconductor 4Bk in the black scanning optical system are equal (i.e., p=l=h=d). Thereby, scanning widths of the last folding-back mirrors (i.e., the third folding-back mirrors 26Y, 26C, 26M, and 26Bk) can be made identical, so that the third folding-back mirrors 26Y, 26C, 26M, and 26Bk can be common elements.

Further, the optical scanning device 5 is configured such that the same number of folding-back mirrors is included in each of the yellow, cyan, magenta, and black scanning optical systems. In this embodiment, three pieces of folding-back mirrors, i.e., the first folding-back mirror 24(Y, C, M, Bk), the second folding-back mirror 25(Y, C, M, Bk), and the third folding-back mirror 26(Y, C, M, Bk), are included in the yellow, cyan, magenta, and black scanning optical systems, respectively. Thereby, deviation in cumulated reflection coefficients of respective folding-back mirrors in the yellow, cyan, magenta, and black scanning optical systems can be suppressed to a minimum, so that differences in beam strengths (light quantities) on surfaces of the photoconductors 4Y, 4C, 4M, and 4Bk and in beam strength deviations (shading) in scanning lines on the surfaces of the photoconductors 4Y, 4C, 4M, and 4Bk can be suppressed. As a result, density unevenness and color unevenness can be avoided in toner images of respective colors formed on the photoconductors 4Y, 4C, 4M, and 4Bk.

Further, the optical scanning device 5 is configured such that in the yellow scanning optical system and the black scanning optical system, symmetrically arranged at the outer side, the long lens 23Y and the long lens 23Bk are not arranged at the downstream side of the folding-back mirrors 24Y, 25Y, and 26Y and the folding-back mirrors 24Bk, 25Bk, and 26Bk. That is, no folding-back mirrors are arranged at this side (upstream) of the long lens 23Y and the long lens 23Bk, so that light rays are never incident onto the long lens 23Y and the long lens 23Bk via folding-back mirrors. Thereby, adverse influence which, when one or more folding-back mirrors are arranged at the upstream side of each of the long lens 23Y and the long lens 23Bk, might be caused on the light ray incident positions on the long lens 23Y and the long lens 23Bk by changes in the attaching positions of respective one or more folding-back mirrors is nil. Accordingly, variations in the light ray incident positions on the long lens 23Y and the long lens 23Bk can be suppressed, and thereby deterioration in the beam spot characteristics on the photoconductors 4Y and 4Bk can be avoided.

Further, in the cyan scanning optical system and the magenta scanning optical system, arranged at the internal side, the first folding-back mirror 24C and the first folding-back mirror 24M are arranged upstream of the long lens 23C and the long lens 23M, respectively. That is, only one folding-back mirror is arranged upstream of the long lens 23C in the cyan scanning optical system and upstream of the long lens 23M in the magenta scanning optical system. Thus, light rays are incident onto the long lens 23C and the long lens 23M only via the first folding-back mirror 24C and the first folding-back mirror 24M, respectively, so that adverse influence which, when one or more folding-back mirrors are arranged upstream of the long lens 23C and the long lens 23M are arranged, might be caused on the light ray incident positions on the long lens 23C and the long lens 23M by changes in the attaching positions of respective one of more folding-back mirrors can be suppressed to minimums, respectively. Accordingly, variations in the light ray incident positions on the long lens 23C and the long lens 23M can be decreased, and thereby deteriorations in the beam spot characteristics on the photoconductors 4C and 4M can be avoided.

In the cyan scanning optical system and the magenta scanning optical system, arranged at the internal side, because the first folding-back mirror 24C and the first folding-back mirror 24M are arranged upstream of the long lens 23C and the long lens 23M, when compared with the yellow scanning optical system and the black scanning optical system at the outer side in which no folding back-mirrors are arranged upstream of the long lens 23Y and the long lens 23Bk, the beam spot characteristics on photoconductors deteriorate. Therefore, in the cyan scanning optical system and the magenta scanning optical system at the internal side, for the first folding-back mirrors 24C and 24M, folding-back mirrors having short side widths wider than those of the second folding-back mirrors 25C and 25M and the third folding-back mirrors 26C and 26M can be used. In FIG. 2, the direction perpendicular to the sheet surface corresponds to the longitudinal direction of the first folding-back mirrors 24C and 24M, and the short sides of the folding-back mirrors 24C and 24M are illustrated.

Thus, by using a mirror having a wider short side width for each of the first folding-back mirror 24C and the first folding back mirror 24M arranged upstream of the long lens 23C and the long lens 23M, alignments of the light receiving surfaces of the first folding-back mirrors 24C and 24M can be made more precise, so that variations in the light ray incident positions on the long lens 23C and the long lens 23M due to tilting of the first folding-back mirrors 24C and 24M can be suppressed.

In the above-described image forming apparatus, the optical scanning device 5, the photoconductors 4Y, 4C, 4M, and 4Bk, and respective process devices such as the development devices and the charging devices for the photoconductors 4Y, 4C, 4M, and 4Bk can be configured as a process cartridge that can be integrally taken out of and put into the main body of the apparatus.

In the above-described embodiment, the description has been made for an image forming apparatus in which toner images formed on respective photoconductors are transferred onto an intermediary transfer belt while being superimposed on top of another on the intermediary transfer belt, and thereafter superimposed toner images on the intermediary transfer belt are transferred onto a recording member. However, the present invention can be applied to an image forming apparatus in which toner images on respective photoconductors are sequentially transferred at one time onto a recording member being conveyed by a transfer belt while being superimposed on top of another on the recording member.

Obviously, numerous modifications and variations of the present invention are possible in light of the above teachings. It is therefore to be understood that within the scope of the appended claims, the present invention may be practiced otherwise than as specifically described herein.

The invention claimed is:

1. An optical scanning device for scanning surfaces of an even number of photoconductors simultaneously, the optical scanning device comprising:
   a housing;
   a rotating deflecting device arranged substantially at a center in the housing to deflect optical beams; and
   a plurality of scanning optical systems respectively corresponding to the even number of photoconductors, arranged to be substantially symmetrical with the rotating deflecting device as a symmetry center, the plurality of scanning optical systems each including a plurality of folding-back mirrors and at least one long lens having power in a sub-scanning direction and configured to correct a scanning line deviated in the sub-scanning direction, respectively, and the pluralities of folding-back mirrors and the at least one long lenses of the symmetrically arranged scanning optical systems being arranged to be symmetrical to each other with the rotating deflecting device as the symmetry center, respectively,
   wherein the surfaces of the even number of photoconductors are simultaneously scanned with optical beams output from the plurality of scanning optical systems and deflected by the rotating deflecting device, and
   wherein in each of the symmetrically arranged scanning optical systems, a same number of folding-back mirrors is arranged downstream of the at least one respective long lens in a direction in which an optical beam deflected by the rotating deflecting device travels, and
   wherein the at least one long lens included in one of the symmetrically arranged scanning optical systems is arranged upside down in a scanning plane relative to the at least one long lens included in another one of the symmetrically arranged scanning optical systems.

2. The optical scanning device according to claim 1, wherein the at least one long lens included in each of the plurality of scanning optical systems is a molded article of resin.

3. The optical scanning device according to claim 1, wherein a number of the plurality of folding-back mirrors in each of the plurality of scanning optical systems is equal.

4. An image forming apparatus comprising:
   an even number of photoconductors; and
   an optical scanning device configured to simultaneously scan surfaces of the even number of photoconductors to form latent images thereupon, respectively, wherein the optical scanning device includes:
   a housing;
   a rotating deflecting device arranged substantially at a center in the housing to deflect optical beams; and
   a plurality of scanning optical systems respectively corresponding to the even number of photoconductors, arranged to be substantially symmetrical with the rotating deflecting device as a symmetry center, the plurality of scanning optical systems each including a plurality of folding-back mirrors and at least one long lens having power in a sub-scanning direction and configured to correct a scanning line deviated in the sub-scanning direction, respectively, and the pluralities of folding-back mirrors and the at least one long lenses of the symmetrically arranged scanning optical systems being arranged to be symmetrical to each other with the rotating deflecting device as the symmetry center, respectively,
   wherein the surfaces of the even number of photoconductors are simultaneously scanned with optical beams output from the plurality of scanning optical systems and deflected by the rotating deflecting device, and
   wherein in each of the symmetrically arranged scanning optical systems, a same number of folding-back mirrors is arranged downstream of the at least one respective long lens in a direction in which an optical beam deflected by the rotating deflecting device travels, and
   wherein the at least one long lens included in one of the symmetrically arranged scanning optical systems is arranged upside down in a scanning plane relative to the at least one long lens included in another one of the symmetrically arranged scanning optical systems.

5. The image forming apparatus according to claim 4, wherein the at least one long lens included in each of the plurality of scanning optical systems of the optical scanning device is a molded article of resin.

6. The image forming apparatus according to claim 4, wherein the optical scanning device is configured such that a number of the respective plurality of folding-back mirrors in each of the plurality of scanning optical systems is equal.

7. A process cartridge for use in an image forming apparatus, the process cartridge comprising:
   an even number of photoconductors; and
   an optical scanning device configured to simultaneously scan surfaces of the even number of photoconductors to form latent images thereupon, respectively,
   wherein the optical scanning device includes:
   a housing;
   a rotating deflecting device arranged substantially at a center in the housing to deflect optical beams; and
   a plurality of scanning optical systems respectively corresponding to the even number of photoconductors, arranged to be substantially symmetrical with the rotating deflecting device as a symmetry center, the plurality of scanning optical systems each including a plurality of folding-back mirrors and at least one long lens having power in a sub-scanning direction and configured to correct a scanning line deviated in the sub-scanning direction, respectively, and the pluralities of folding-back mirrors and the at least one long lenses of the symmetrically arranged scanning optical systems being arranged to be symmetrical to each other with the rotating deflecting device as the symmetry center, respectively,
   wherein the surfaces of the even number of photoconductors are simultaneously scanned with optical beams output from the plurality of scanning optical systems and deflected by the rotating deflecting device, and
   wherein in each of the symmetrically arranged scanning optical systems, a same number of folding-back mirrors is arranged downstream of the respective at least one long lens in a direction in which an optical beam deflected by the rotating deflecting device travels, and
   wherein the at least one long lens included in one of the symmetrically arranged scanning optical systems is arranged upside down in a respective scanning plane relative to the at least one long lens included in another one of the symmetrically arranged scanning optical systems.

8. The process cartridge according to claim 7, wherein the at least one long lens included in each of the plurality of scanning optical systems of the optical scanning device is a molded article of resin.

9. The process cartridge according to claim 7, wherein the optical scanning device is configured such that a number of respective pluralities of folding-back mirrors in each of the plurality of scanning optical systems is equal.

10. A method of making an optical scanning device for scanning surfaces of an even number of photoconductors simultaneously, the method comprising:

arranging a rotatable optical beam deflecting device substantially at a center in a housing; and arranging a plurality of scanning optical systems respectively corresponding to the even number of photoconductors to be substantially symmetrical with the optical beam deflecting device as a symmetry center, the plurality of scanning optical systems including a plurality of folding-back mirrors and at least one long lens having power in a sub-scanning direction and configured to correct a scanning line deviated in the sub-scanning direction, respectively, and the pluralities of folding-back mirrors and the at least one long lenses of the symmetrically arranged scanning optical systems being arranged to be symmetrical to each other with the optical beam deflecting device as the symmetry center, respectively, wherein in each of the symmetrically arranged scanning optical systems, a same number of folding-back mirrors is arranged downstream of the at least one respective long lens in a direction in which an optical beam deflected by the optical beam deflecting device travels, and wherein the at least one long lens included in one of the symmetrically arranged scanning optical systems is arranged upside down in a scanning plane relative to the at least one long lens included in another one of the symmetrically arranged scanning optical systems.

11. The method according to claim 10, wherein the at least one long lens included in each of the plurality of scanning optical systems is a molded article of resin.

12. The method according to claim 10, wherein a number of respective pluralities of folding-back mirrors in each of the plurality of scanning optical systems is equal.

13. The image forming apparatus according to claim 4, wherein in each of the symmetrically arranged scanning optical systems, distances between respective pluralities of the folding-back mirrors, arranged to be symmetrical to each other, respectively, and distances between reflecting parts of the rotating deflecting device and adjacent folding-back mirrors of the respective pluralities of folding-back mirrors are equal, respectively.

14. The image forming apparatus according to claim 13, wherein in the symmetrically arranged scanning optical systems of the optical scanning device, at least one pair of folding-back mirrors of the respective pluralities of folding-back mirrors, arranged to be symmetrical to each other, are arranged such that angles formed by incident light rays and reflecting light rays at respective surfaces of the at least one pair of folding-back mirrors are equal.

15. The image forming apparatus according to claim 13, wherein the optical scanning device is configured such that in the plurality of scanning optical systems, distances from last folding-back mirrors of the respective pluralities of folding-back mirrors, which lastly guide the optical beams deflected by the rotating deflecting device to the surfaces of the even number of photoconductors, respectively, to the surfaces of the even number of photoconductors are equal.

16. The image forming apparatus according to claim 13, wherein the optical scanning device is configured such that a number of the plurality of folding-back mirrors in each of the plurality of scanning optical systems is equal.

17. An image forming apparatus according to claim 4, wherein in each of the scanning optical systems, arranged to be symmetrical to each other with the rotating deflecting device as the symmetry center at positions farther from the rotating deflecting device at both sides of the rotating deflecting device, all of the plurality of folding-back mirrors are arranged downstream of the at least one respective long lens in a direction in which an optical beam deflected by the rotating deflecting device travels.

18. The image forming apparatus according to claim 17, wherein the optical scanning device is configured such that in each of the scanning optical systems arranged to be symmetrical to each other with the rotating deflecting device as the symmetry center at positions nearer the rotating deflecting device at both sides of the rotating deflecting device, one of the plurality of folding-back mirrors is arranged upstream of the respective at least one long lens in a direction in which an optical beam deflected by the rotating deflecting device travels.

19. The image forming apparatus according to claim 18, wherein the one of the plurality of folding-back mirrors arranged upstream of the at least one long lens is wider in a short side thereof than others of the plurality of folding-back mirrors.

20. The image forming apparatus according to claim 17, wherein the optical scanning device is configured such that a number of the plurality of folding-back mirrors in each of the plurality of scanning optical systems is equal.

* * * * *